United States Patent [19]

Matsunaga et al.

[11] Patent Number: 4,802,555
[45] Date of Patent: Feb. 7, 1989

[54] OIL SUPPLY SYSTEM

[75] Inventors: Takao Matsunaga, Tachikawa; Kazuo Nakajima, Sayama; Masaki Kobayashi, Kodaira, all of Japan

[73] Assignee: Komatsu Zenoah Co., Japan

[21] Appl. No.: 558,694

[22] Filed: Dec. 6, 1983

Related U.S. Application Data

[63] Continuation of Ser. No. 276,037, Jun. 22, 1981, abandoned.

[30] Foreign Application Priority Data

Feb. 13, 1981 [JP] Japan ............... 56-018245[U]

[51] Int. Cl.4 ............................................. F16N 7/14
[52] U.S. Cl. ............................. 184/15.1; 184/55.1; 30/123.4
[58] Field of Search .................. 184/6, 14, 15.1, 28, 184/55.1, 57; 30/123.4, 381, 382, 386, 387; 83/169; 123/196 CP

[56] References Cited

U.S. PATENT DOCUMENTS

| | | | |
|---|---|---|---|
| 1,914,325 | 6/1933 | Corey | 184/55 R X |
| 2,605,787 | 8/1952 | Kiekhaefer | 184/15 R X |
| 2,748,810 | 6/1956 | Strunk | 30/123.4 |
| 2,944,538 | 7/1960 | Conway et al. | 184/15 R X |
| 3,051,264 | 8/1962 | Batchelor | 184/15.1 |
| 3,067,837 | 12/1962 | Burrows | 184/15.1 |
| 3,332,411 | 7/1967 | Bloom et al. | 184/15.1 |
| 3,559,764 | 2/1971 | Wheeler | 184/55 R |
| 3,618,709 | 11/1971 | Boelkins | 184/55 R X |
| 3,776,369 | 12/1973 | Schrack et al. | 184/15 R |
| 3,837,432 | 9/1974 | McKendrick | 184/55 R X |
| 4,094,382 | 6/1978 | Lee | 184/15 R |

FOREIGN PATENT DOCUMENTS 53-11709 of 1978 Japan .

Primary Examiner—David H. Brown
Attorney, Agent, or Firm—Jones, Askew & Lunsford

[57] ABSTRACT

Improved apparatus for supplying lubricating oil to the chain of a chain saw powered by an internal combustion engine. A lubricating oil tank is pressurized by communication with the crankcase of the engine, and the pressure forces oil from the oil tank to lubricate the saw chain. An air control valve is disposed in the air passage between the crankcase and the lubricating oil tank, and this valve is selectively operable to adjust the pressurization of the oil tank. The control valve is manually adjustable to adjust the pressurization of the lubricating oil tank, so as to accommodate changes in lubrication caused by factors such as changes in temperature, lubricating oil viscocity, or the like.

4 Claims, 5 Drawing Sheets

OIL SUPPLY SYSTEM

This application is a continuation of application Ser. No. 276,037, filed June 22, 1981, now abandoned.

BACKGROUND OF THE INVENTION

This invention relates to an oil supply system incorporated with a lubricating oil tank pressurized in communication with the crank case through a pressurizing passage and an oil supply passage communicating the aforesaid lubricating oil tank and an oil supply unit.

In general, in this kind of oil supply system applied to a chain saw, for a short period time after its engine is brought to a standstill, under the pressure prevailing inside the lubricating oil tank, lubricating oil is transported to the oil supply unit of the chain saw and it is allowed to flow to the outside. Consequently, in the past, a breather valve is installed on to the lubricating oil tank in such a way that atmosphere and the lubricating oil tank is made to communicate with the external air through a throttling hole and thus, after the engine is brought to a standstill, the pressure inside the lubricating oil tank is allowed to flow out to the atmosphere through the throttling hole for stopping the lubricating oil supply to the oil supply unit. However, as the sectional area of the aforesaid throttling hole was made fixed and invariable, control of the lubricating oil quantity in accordance with a workpiece to be sawn off was unavailable with the result of deteriorating the working efficiency of the chain saw depending upon the nature of the work.

SUMMARY OF THE INVENTION

The purpose of this invention is to eliminate the aforesaid discrepancies experienced in the past, by installing a regulating valve in the pressurizing passage available for variably controlling its cross sectional area and by improving the working efficiency of the sawing operation through controlling the oil supply quantity in accordance with the workpiece to be sawn off. Additionally, in order to attain this effect, there is provided a lubricating oil tank pressurized by communication with the crank case through the pressurizing passage and a oil supply passage connecting the aforesaid lubricating oil tank and the oil supply unit 19. Inside the pressurizing passage 21, the controlling valve 27 available for free control of the cross sectional area is installed.

DESCRIPTION OF PREFERRED EMBODIMENT

In the following description, a detailed explanation of a practical embodiment of the present invention is given with regard to the attached drawings.

Figure 1:
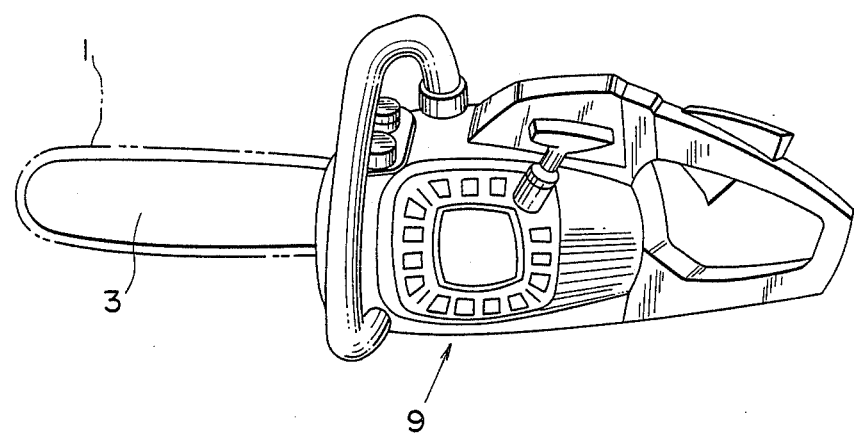
FIG. 1 represents a perspective explanatory drawing of a preferred embodiment of a chain saw according to the present invention.
Figure 4:
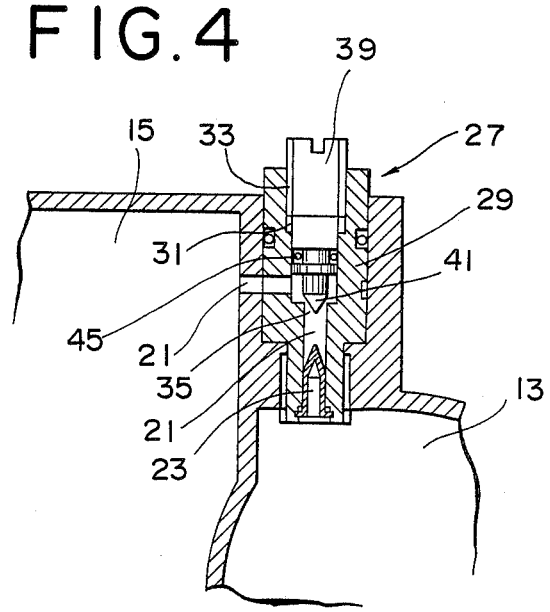
FIG. 4 represents a side sectional view of an important part of the aforesaid system.

In FIG. 1 through to FIG. 4, 1 represents an endless chain of a chain saw for cutting off a workpiece, the chain mounted free to rotate on the periphery of a supporting bar 3, driving for rotation being conducted by a sprocket wheel 5. Numeral 7 represents a driving shaft of engine 9 driving the sprocket wheel 5. Numeral 11 represents a cylinder of engine 9 and, 13 a crank case of engine 9. Numeral 15 represents a lubricating oil tank, 17 an oil supply passage communicating an oil supply unit 19 installed on a supporting surface of the saw chain 1 of the supporting bar 3 with the lower part of the lubricating oil tank 15 and, 21 a pressurizing passage communicating the upper part of the crank case 13 and the upper part of the lubricating oil tank 15. A check valve 23 is installed in the passage 21 for limiting the communication only from the crank case 13 to the lubricating oil tank 15. Numeral 25 represents an oil supplying opening, and 27 is a controlling valve installed inside the pressurizing passage 21 located between the check valve 23 and the lubricating oil tank 15.

The controlling valve 27 is constructed in the following manner: namely, a main body 29 is communicatingly installed inside the pressurizing passage 21, including inside a bore 31, female thread 33 provided in the bore 31 and a valve hole 35 communicating itself with the lower part of the female thread 33. A valve body 39 is screwed into the female thread 33, and a needle 41 is placed at the bottom of the valve body 39 with an inclined surface converging to a smaller diameter toward the lower end. The valve body 39 is fitted free to displace inside the bore 31. An O-ring 45 is mounted on the valve body 39.

In the aforesaid practical embodiment of the invention, when the engine 9 is rotated to drive the sprocket wheel 5, the saw chain is permitted to rotate along the periphery of the supporting bar 3 for sawing the work. Although the air pressure inside the crank case fluctuates as the engine operates, with the aid of the check valve 23, the pressure air inside the crank case 13 pressurizes the lubricating tank 15 to a superatmospheric pressure through the pressuring passage 21, lubricating oil located inside being kept under pressure by the said pressure. The lubricating oil is supplied to the oil supply unit 19 through the oil supply passage 17. For controlling the supply oil quantity, when the valve body 39 is rotated to a proper extent, the passage area formed between the upper end of the valve hole 35 and the needle 41 is adjusted to a desired extent and consequently, the fluctuation of oil supplied to lubricate the chain is controlled to the desired extent by the pressure inside the lubricating oil tank 15.

Pertaining to the invention, there is provided the pressurized lubricating oil tank communicated with the crank case through the pressurized passage and the oil supply passage communicating the aforesaid lubricating oil tank and the oil supply unit, and the oil supply system is provided with the controlling valve inside the pressurized passage available for free control of the passage area. Consequently, if a change of viscosity of lubricating oil is brought on by, for instance, conditions of the work or the atmospheric temperature, the cutting efficiency of the chain saw can constantly be kept in the optimum condition by controlling the oil supply quantity to a proper extent and at the same time, in accordance with the change of working conditions, the control of the oil supply system is available with the possibility of minimizing the quantity of oil wastefully consumed, an improving the working efficiency with simpler construction and economical production of the items involved in the invention.

Figure 2:
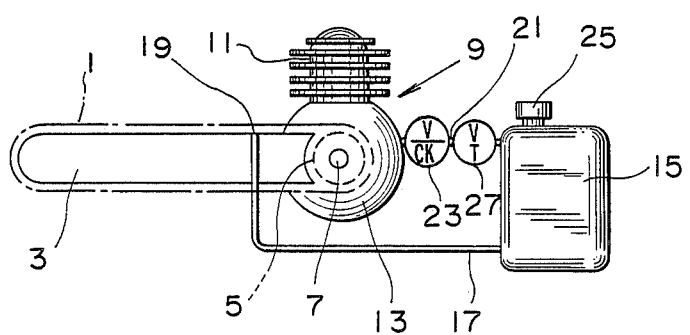
FIG. 2 represents an explanatory drawing of the oil supply system of the chain saw equipped with the system according to the present invention.
Figure 3:
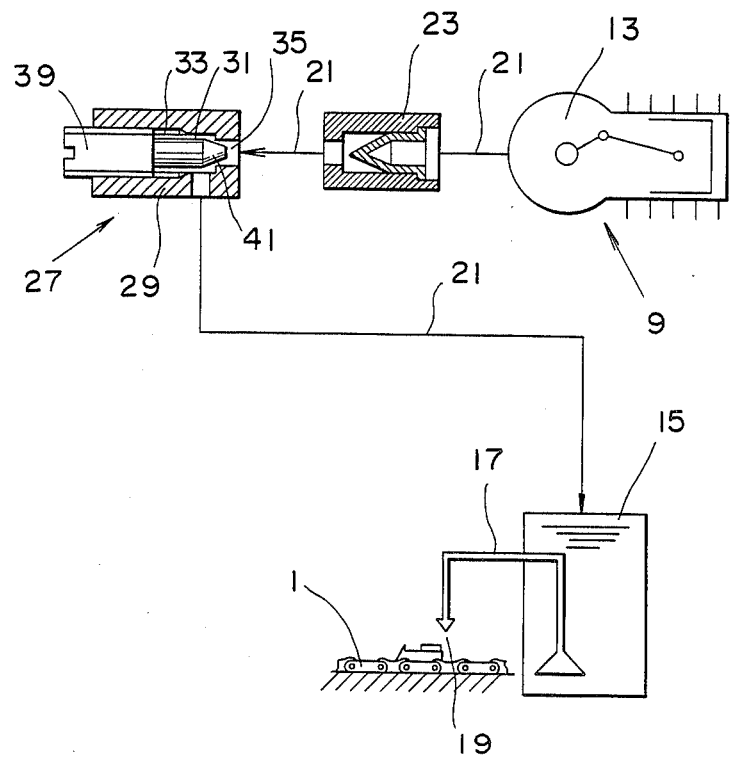
FIG. 3 represents an explanatory drawing of the oil supply system, as a practical embodiment of the present invention.
Figure 5:
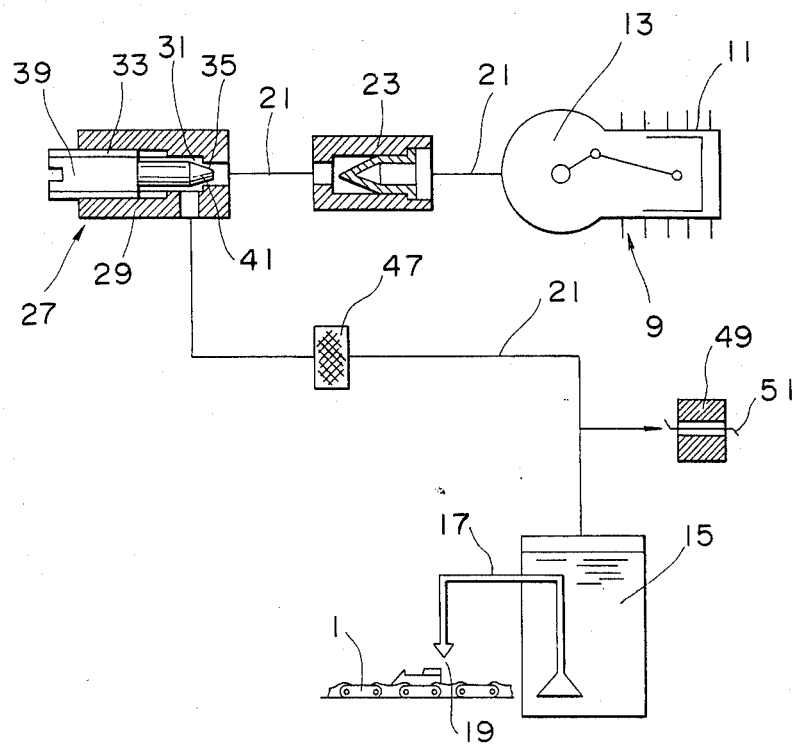
FIG. 5 represents an explanatory drawing of the oil supply system of a practical embodiment.
Figure 6:
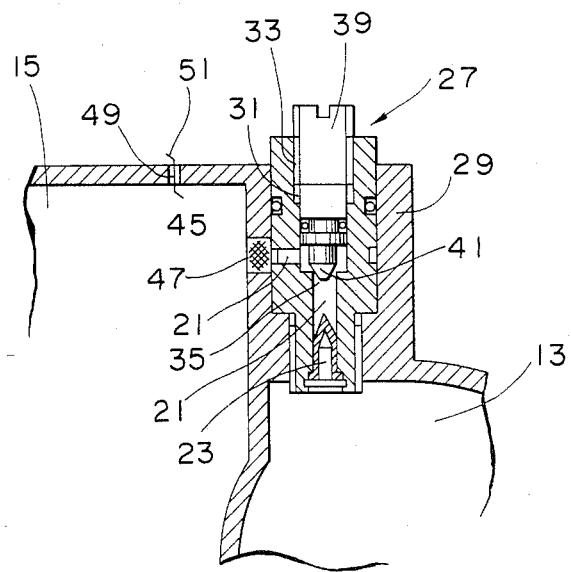
FIG. 6 represents a side sectional view of an important part of the system in FIG. 5.
Figure 7:
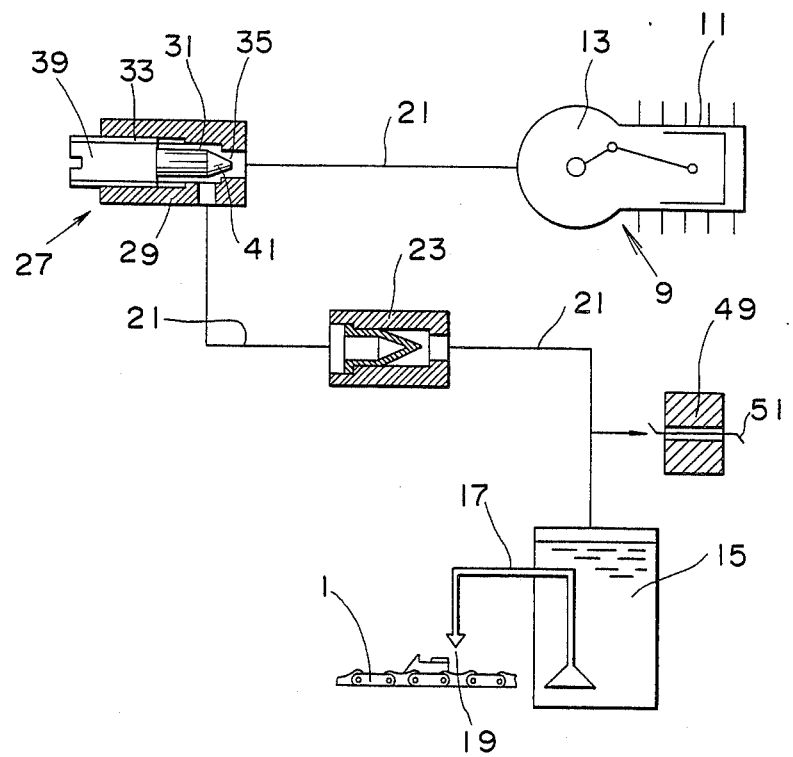
FIG. 7 represents an explanatory drawing of the oil supply system of a practical embodiment.
Figure 8:
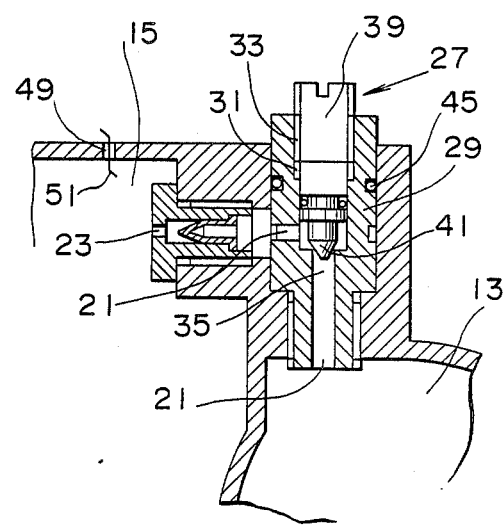
FIG. 8 represents a side sectional view of an important part of the system in FIG. 7.
Figure 9:
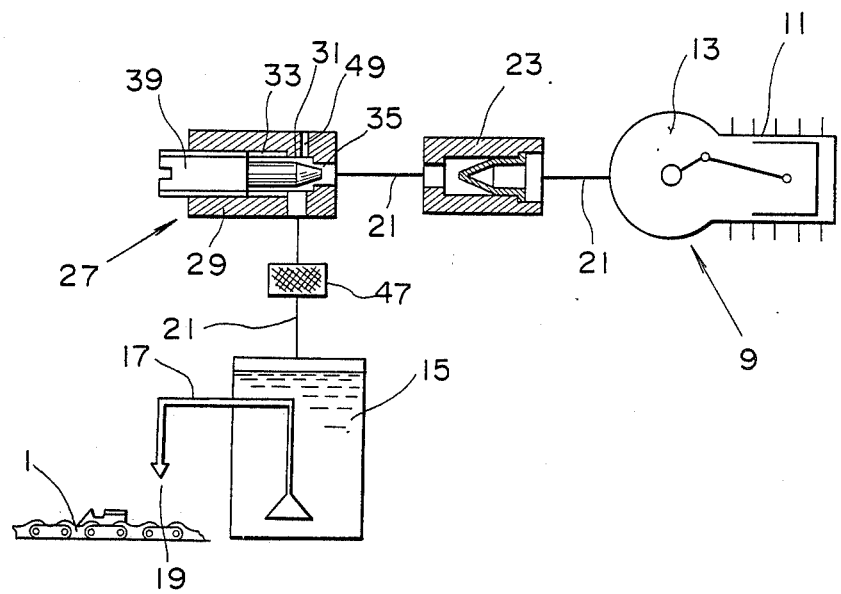
FIG. 9 represents an explanatory drawing of the oil supply system of a fourth embodiment.
Figure 10:
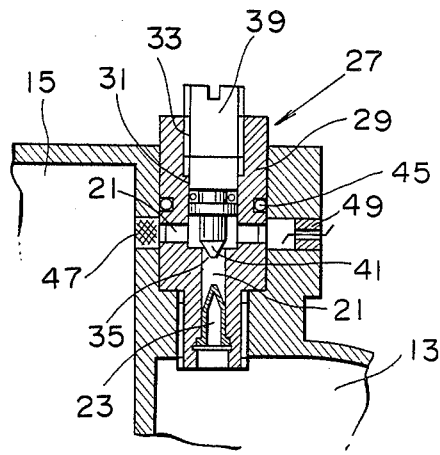
FIG. 10 represents a side sectional view of an important part of the system in FIG. 9.

FIG. 5 and FIG. 6 represent the second practical embodiment of the invention in which a filter 47 is installed inside a pressuring passage 21 located between the controlling valve 27 and the lubricating oil tank 15 shown in the first embodiment of the invention illustrated in FIG. 2 through FIG. 4, thus preventing infiltration of lubricating oil into the controlling valve 27. A breather hole 49 is provided which communicates the lubricating oil tank 15 with the atmosphere, thus quickly reducing pressure inside the lubricating oil tank 15 after stopping of the engine. Further, 51 represents a piece of wire introduced loosely in the breather hole 49 for prevention of plugging of the aforesaid breather hole 49. FIG. 7 and FIG. 8 represent the third embodiment of the invention, in which a controlling valve 27 is provided inside the pressurizing passage 21 located between the crank case 13 and the check valve 23. Further, FIG. 9 and FIG. 10 represent the fourth embodiment of the invention in which a breather hole 49 is provided branching off from the pressurizing passage 21 for communication with the atmosphere. Further, in FIG. 5 through FIG. 10, elements shown in the same way as in FIG. 1 through FIG. 4.

The foregoing relates only to a preferred embodiment of the present invention, and numerous changes and modifications may be made therein without departing from the spirit and scope of the invention as defined in the claims.

What we claim is:

1. An oil supply system for a chain saw including a saw chain powered by an internal combustion engine having a crankcase, said system lubricating the saw chain and comprising:
    a lubricating oil reservoir;
    air passage means communicating between said oil reservoir and the crankcase of said engine to pressurize said oil reservoir in response to operation of the engine;
    means defining an oil communicating passage without a flow adjusting means between said oil reservoir and the saw chain to be lubricated, so that oil can flow to the chain from said pressurized oil reservoir; and
    adjustable valve means associated with said air passage means and selectably operative to adjust the amount of air supplied through said air passage means to said oil reservoir from the engine;
    so as to selectably adjust the amount of oil flowing through said oil communicating passage and applied to lubricate the saw chain without requiring a means in the oil communicating passage to adjust the flow of oil therethrough.

2. The system as in claim 1, wherein:
    said engine is operatively associated with said chain being supplied with oil, and the pressure supplied through said air passage means is dependent on engine operation; and
    said adjustable valve means is operative independently of said engine to vary the cross-section area of said air passage means and thus to adjust the pressurization of said oil reservoir, so that the amount of oil applied to said chain in response to engine operation is selectably adjustable.

3. An oil supply system for a chain saw including a saw chain powered by an internal combustion engine having a crankcase which is intermittently pressurized with air in response to engine operation, said system operating to lubricate the saw chain and comprising:
    a lubricating oil reservoir;
    air passage means communicating between said oil reservoir and the crankcase of said engine to conduct said pressurized air from the crankcase to said oil reservoir in response to engine operation;
    means defining an oil communicating passage fixed in cross-sectional area between said oil reservoir and the saw chain to be lubricated, so that the pressurized air supplied to the oil reservoir causes oil to flow to the chain from said pressurized oil reservoir; and
    adjustable valve means connected to said air passage means between the crankcase and said oil reservoir and selectably operative to adjust the amount of said pressurized air supplied through said air passage means from the engine crankcase to pressurize the oil reservoir, so as to selectably control the amount of oil flowing through said oil passage of fixed area to lubricate the chain without requiring a valve means in the oil communicating passage.

4. The system as in claim 3, wherein:
    said air pressure supplied through said air passage means is dependent on the speed of engine operation; and
    said adjustable valve means is operative independently of said engine to vary the cross-section area of said air passage means and thus to adjust the air pressurization of said oil reservoir, so that the amount of oil applied to said chain in response to engine operation is selectably adjustable by said valve means.

* * * * *